United States Patent [19]

Raczuk

[11] 3,726,092
[45] Apr. 10, 1973

[54] VARIABLE EXHAUST SYSTEM FOR COMBUSTION ENGINE

[76] Inventor: Richard Charles Raczuk, 17218 Index Street, Granada Hills, Calif. 91344

[22] Filed: Mar. 29, 1971

[21] Appl. No.: 128,770

[52] U.S. Cl. ................................60/314, 123/65 E
[51] Int. Cl. .........................................F01n 7/08
[58] Field of Search..................60/275, 312, 313, 60/314; 123/65 E

[56] References Cited

UNITED STATES PATENTS

| | | | |
|---|---|---|---|
| 2,102,559 | 12/1937 | Kadenacy | 60/273 |
| 3,254,484 | 6/1966 | Kopper | 60/275 |
| 3,367,311 | 2/1968 | Tenney | 60/314 |
| 3,385,052 | 5/1968 | Holtermann | 60/314 |
| 3,434,280 | 3/1969 | Burkhart | 60/314 |

*Primary Examiner*—Douglas Hart
*Attorney*—Nilsson, Robbins, Wills & Berliner

[57] ABSTRACT

An exhaust system is disclosed with movable elements to accommodate various operating states of an associated engine. In one embodiment a diverging megaphone faces a reflector which may be variously positioned in relation to the end of the megaphone, while in a second embodiment an expansion chamber is provided of various effective size in accordance with engine operation. Manual control means is disclosed as a part of the system for accomplishing various positions, as well as a structure for controlling the state of the exhaust system in accordance with the position of the engine throttle.

4 Claims, 5 Drawing Figures

PATENTED APR 10 1973  3,726,092

INVENTOR.
RICHARD C. RACZUK
BY
NILSSON, ROBBINS, WILLS & BERLINER
ATTORNEYS

VARIABLE EXHAUST SYSTEM FOR COMBUSTION ENGINE

BACKGROUND AND SUMMARY OF THE INVENTION

In the past, it has been proposed to increase the performance of an internal-combustion, reciprocating engine by variously improving the exhaust system. One concept has been to utilize pressure variations developed within an exhaust system to supplement the control for moving gases to improve engine performance. In effect, an exhaust system may develop some rather substantial pressures that are both positive and negative with reference to ambient, and which pressures may be effectively utilized to accomplish more desirable movement of gases through the engine.

Essentially, it is desirable to provide a negative pressure at the engine exhaust port during the interval when both the exhaust and transfer ports are fully open, so as to more effectively draw a charge of fresh gas into the cylinder. Subsequently, as the exhaust port closes it is desirable to provide a positive pressure to restore and maintain the fresh charge of gas in the cylinder and initiate compression. Exhaust systems have been proposed for accomplishing such pressure variations; however, design considerations tend to be exceedingly complex, and sizes are very critical in relation to specific engines and operating conditions. The problems generally related to designing exhaust systems for internal combustion engines are perhaps more difficult in relation to small engines, e.g., two cycle engines. Generally, applications for such engines involve a demand for high performance yet, are so varied that flexibility is required. Furthermore, the inherent problems of design are compounded by reason of noise-control considerations and space limitations. Consequently, a need exists for an improved, more flexible exhaust system.

It has been determined that the design considerations for an exhaust system include the operating speed of the engine. Generally, the significance of speed may be somewhat more apparent with the recognition that the exhaust system receives gas pulses, the frequency of which is directly related to the operating speed of the engine. Thus, a need exists for an exhaust system that may be more-uniformly used on small engines, and which is capable of accomplishing improved operating performance at various engine speeds.

In general, the present invention is directed to an exhaust system, the characteristics of which may be varied to enhance performance of a particular engine operating at a particular speed. Specifically, the system includes a chamber means, the walls of which define a chamber with an intake opening (adapted to be connected to the exhaust port of an engine) and an exhaust opening. The effective size of the chamber as provided, may be varied in accordance with the operating speed of the associated engine for improved performance.

BRIEF DESCRIPTION OF THE DRAWINGS

In the drawings, which constitute a part of this specification, exemplary embodiments demonstrating various objectives and features hereof are set forth as follows.

DETAILED DESCRIPTION OF THE ILLUSTRATIVE EMBODIMENTS

Figure 1:
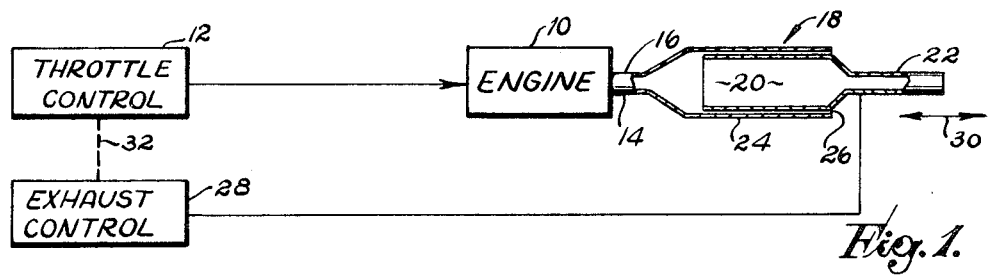
FIG. 1 is a block and schematic diagram illustrative of a system incorporating the present invention.

Referring initially to FIG. 1, an engine 10 is represented, the operating speed of which is controlled by a throttle 12. The engine 10 may comprise any of a variety of two-cycle units, for example, and the throttle 12 may incorporate any of a variety of well known mechanical or other control arrangements. The exhaust port 14 of the engine 10, as indicated in FIG. 1, is connected through a pipe 16 to an exhaust unit 18. As somewhat symbolically represented in FIG. 1, the exhaust unit 18 defines a chamber 20 of variable size between the pipe 16 and a tubular outlet 22. Specifically, the cylindrical portions of members 24 and 26 may be variously telescopically related by an exhaust control 28, to vary the effective size of the chamber 20.

Generally, it has been determined that the length of the chamber 20 is desirably inversely related to the operating speed of the engine 10. Accordingly, the exhaust control 28 may be employed to move the member 26 in either direction as indicated by an arrow 30 in accordance with the operating speed of the engine 10. As indicated by a dashed line 32, the throttle 12 may be coupled to the exhaust control 28 to afford a unitary control. Alternatively, as described in greater detail below, the two controls may be completely independent.

Considering the operation of the exhaust unit 18 in somewhat greater detail, it has been determined that a cyclic pressure variation may be developed in the pipe 16 that will improve the performance of the engine 10. Generally, the pressure pulse of exhaust gases (discharged from the exhaust port 14 into the pipe 16, on combustion) is followed by a partial vacuum, somewhat as a wave pattern with reference to time. As indicated above, the partial vacuum may be utilized to improve the flow of gases to charge a cylinder for another combustion. Additionally, improved performance also may be attained by terminating the partial vacuum at a time when the cylinder is fully charged. Accordingly, the expansion chamber 20 develops a reflection or echo of the positive pressure to elevate the pressure in the pipe 16 when the cylinder is charged, halting the flow of such fresh charge from the engine.

The frequency (and phase) of the pressure pulses from the engine 10 vary with the speed of the engine. Accordingly, the effective length of the chamber 20 is adjusted or tuned by the exhaust control 28 to preserve the desired timing relationship in the exhaust system. During high-speed operation of the engine 10, the effective length of the chamber 20 is relatively short to accomplish a short interval between pressure pulse and pressure reflection, or echo. Conversely, when the engine 10 is operating at a low speed, the desired length of the chamber 20 is effectively long, so that the reflection of increased pressure is not returned to the pipe 16 until a longer interval of time has passed. Thus, the engine 10, in various forms, is effectively accommodated at various operating speeds.

Considering a more-detailed embodiment of the exhaust unit 18, reference will now be made to FIG. 2 which shows a substantially cylindrical housing 34 having an axial entry through a connection flange 36 and a short tubular section 38. The flange 36 may incorporate various connectors as well known in the prior art for coupling the unit to the exhaust port of an engine.

The tubular section 38 is concentrically affixed in a circular wall 39 of the housing 34 and is integral with a coaxial, somewhat conical, diverging megaphone or diffuser 40 positioned inside the housing 34. The enlarged end 42 of the diffuser 40 terminates at a location that is spaced a substantial distance from the opposed circular wall 44 of the housing 34. A collar 46 is centrally affixed in the wall 44 and matingly receives a sliding rod 48, the internal end of which carries a reflector 50 of circular configuration and having a diameter to substantially mate with the inside diameter of the housing 34. The external end of the rod 48 is connected to a control cable 52 which may be actuated as described in detail below, to vary the effective size of the chamber 49 that exists between the diffuser 40 and the opposing face of the reflector 50.

The forward end wall 39 of the housing 34 also receives an axially offset pipe 54 which incorporates two bends to change direction and extend as a length 56 toward the rear wall 44 of the housing 34. Thus, the path of exhaust gases through the unit of FIG. 2 is through the intake pipe 38, out of the diffuser 40 to be returned from the reflector 50 and pass between the end 42 (of the diffuser 40) and the cylindrical wall 51 of the housing 34, and finally pass from the pipe 54.

Figure 2:
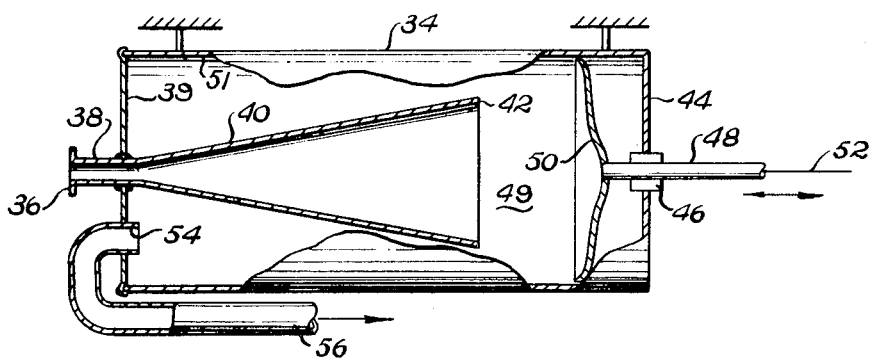
FIG. 2 is a partially sectioned side view of a specific embodiment of a portion of the system illustrated in FIG. 1.

In the operation of the unit of FIG. 2, the reflector 50 may be variously spaced (by the cable 52) in relation to the end 42 of the diffuser 40, which space defines the chamber 49 and is generally inversely related to the operating speed of the engine. Accordingly, as considered above, the reflector 50 accomplishes an echo or reflected pressure pulse in the tubular section 38 in timed relationship with the operating speed of the associated engine, whereby to halt the dissipation of a fresh charge from the engine cylinder immediately prior to closure of the exhaust port (not shown). Furthermore, as indicated above, the elevated pressure initiates compression within the cylinder (not shown) and accordingly, improves performance of the engine.

Figure 3:
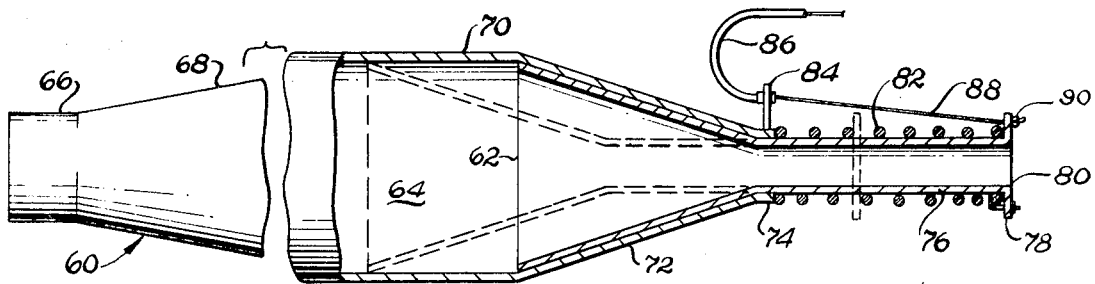
FIG. 3 is a partially sectioned side view of an alternative structure to that shown in FIG. 2.

Referring now to FIG. 3, another embodiment of the exhaust structure is represented somewhat as a variable-length expansion chamber. Generally, a conically ended housing 60 slidably receives a conical diverging member 62 (shown in two positions, actual and phantom). As the diverging member 62 is variously positioned along the length of the housing 60, the effective size of the chamber 64 is varied to attain the operation characteristics described above for a specific engine operating at a specific speed.

The housing 60 includes an initial tubular length 66 for coupling the unit to the exhaust port (not shown) of an engine. Generally, the length 66 may incorporate a flange as previously disclosed or various other forms of fasteners as well known in the prior art. Alternatively, the length 66 may simply be welded or otherwise integrally affixed to receive exhaust gases from an internal combustion engine.

The tubular length 66 terminates in a diffusing or diverging length 68 which is generally conical and may be integrally formed with the tubular length 66. The housing 60 next includes a cylindrical length 70 which in turn terminates at a converging length 72 of generally conical shape, the small end of which is integral with a short collar 74.

The internal member 62 is coaxially affixed to an elongated tubular section 76 which passes in sliding relationship through the collar 74. The external end of the tubular section 76 (remote from the length 70) carries a flange 78 defining an outlet port 80 and confining a compression coil spring 82 by engagement at an outward end. The inward end of the coil spring 82 abuts the collar 74, so that as the spring expands to an uncompressed state, the internal conical member 62 is drawn into mating engagement with the length 72 of the housing 60, as shown, thereby providing the greatest size for the expansion chamber 64.

A bracket 84 is affixed to the outside of the collar 74 and supports a cable 86, the sliding internal wire 88 of which is attached to the flange 78 by a fastener 90. Thus, the diverging member 62 may be moved from a mating end position, as shown, to an internal position as indicated in phantom. One form of structure for moving the member 62 through the cable 86 is disclosed in detail below.

The units as illustrated in FIGS. 2 and 3 may be variously manufactured using any of a wide variety of metal shaping techniques. Specifically, for example, with regard to the unit of FIG. 3, the lengths 66, 68 and 70 may be formed as one integral component, as from stainless steel or other material while the length 72 and the collar 74 are separately formed as another component. The member 62 with the tubular section 76 may then be fitted into the length 72, and the two separately formed components (comprising the housing 60) may be affixed together as by welding or other joining techniques.

In operation, the coil spring 82 urges the internal member 62 outwardly to define a large effective chamber. As indicated above, this operating configuration serves low-speed operation of an engine. The smaller effective chamber (existing when the member 62 is pushed inwardly) accommodates high-speed engine operation.

Figure 4:
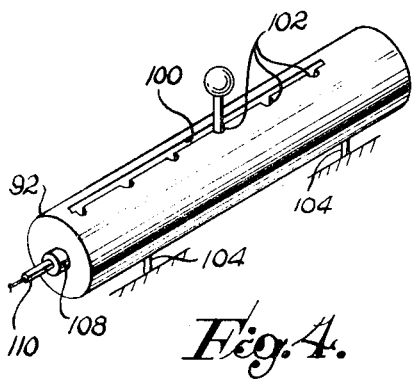
FIG. 4 is a perspective view of a control unit as may be embodied in the system of FIG. 1.
Figure 5:
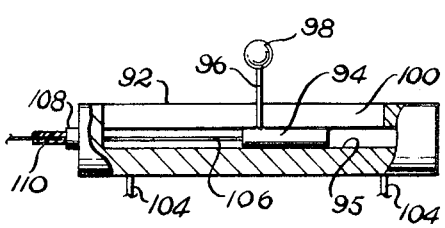
FIG. 5 is a vertical sectional view taken longitudinally through the structure of FIG. 4.

As indicated above, the means positioning the elements in the exhaust units as depicted, may be a structure directly controlled by the engine throttle. Alternatively, a separate control unit may be provided. Of course, a wide variety of different control units are readily adaptable to afford the desired positioning; however, one such exemplary unit is illustrated in FIGS. 4 and 5 and will now be considered.

An end-closed cylindrical body 92 telescopically receives a sliding rod 94 (FIG. 5) having a radially extending handle 96 which terminates in a knob 98. The handle 96 extends through an elongated, axially aligned slot 100 (FIG. 4) which is defined in the body 92. The slot incorporates a plurality of transverse locking detents 102 for receiving the handle 96 to establish a variety of locked positions.

The body 92 is rigidly supported as indicated by brackets 104 so that as the rod 94 is variously positioned within the tubular space 95, a wire 106 affixed to the rod 94 is variously positioned. The wire 106 extends from the body 92 through a coupling 108 which also receives a cable sheath 110 for guiding the wire 106 to the exhaust structure. Of course, a wide variety of different specific arrangements may be employed between the control unit and the exhaust unit. As depicted in FIGS. 4 and 5, the wire 106 may be simply coupled to control the variable effective length of the muffler unit, e.g., the wire 106 may be continuous with the wire 88 (FIG. 3). Of course, various other design arrangements will also be readily apparent both in detailed structure and overall system; accordingly, the scope hereof is as set forth in the claims as follows.

What is claimed is:

1. An exhaust system for a combustion engine, having an exhaust port, comprising:
    a housing chamber including a conical diffusing section and an integral concentric cylindrical section;
    means for coupling said conical diffusing section of said housing chamber to said exhaust port;
    an internal conical member slidably received in said housing chamber in facing-opposed concentric relationship to said conical diffusing section;
    spring biasing means for urging said internal conical member whereby to separate said member from said conical diffusing section; and
    an actuator means for moving said internal conical member to various relative positions in said housing chamber for different operating speeds of said engine.

2. A system according to claim 1 wherein said internal conical member further includes an elongate, integral concentric tube and wherein said spring biasing means comprises a coil spring positioned on said tube for providing a force between said tube and said housing chamber.

3. A system according to claim 1 wherein said actuator means comprises a coupling from the throttle control of said engine to said internal conical member.

4. A system according to claim 1 wherein said actuator means comprises a cylindrical body, a telescopic rod slidably received in said body, a radially extending handle affixed to said rod for locking engagement with said body, and a cable extending from said rod to said internal conical member.

* * * * *